US011312361B2

(12) United States Patent
Tagami et al.

(10) Patent No.: US 11,312,361 B2
(45) Date of Patent: Apr. 26, 2022

(54) CONTROL DEVICE FOR HYBRID VEHICLE

(71) Applicant: HONDA MOTOR CO., LTD., Tokyo (JP)

(72) Inventors: Hiroshi Tagami, Saitama (JP); Xiang Liu, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/892,856

(22) Filed: Jun. 4, 2020

(65) Prior Publication Data

US 2020/0298826 A1 Sep. 24, 2020

Related U.S. Application Data

(62) Division of application No. 15/922,121, filed on Mar. 15, 2018, now Pat. No. 10,906,525.

(30) Foreign Application Priority Data

Mar. 17, 2017 (JP) .............................. JP2017-053550

(51) Int. Cl.
*B60W 20/14* (2016.01)
*B60W 30/18* (2012.01)
(Continued)

(52) U.S. Cl.
CPC ............. *B60W 20/14* (2016.01); *B60K 6/442* (2013.01); *B60W 10/06* (2013.01); *B60W 10/08* (2013.01);
(Continued)

(58) Field of Classification Search
CPC ...... B60W 20/14; B60W 10/08; B60W 10/06; B60W 10/184; B60W 30/18136; B60W 30/18127; B60W 2510/244
See application file for complete search history.

(56) References Cited

U.S. PATENT DOCUMENTS 6,988,779 B2   1/2006 Amanuma et al.
9,718,459 B2 * 8/2017 Imamura ......... B60W 30/18127
(Continued)

FOREIGN PATENT DOCUMENTS

CN   102963360 A   3/2013
CN   103079926 A   5/2013
(Continued)

OTHER PUBLICATIONS

Jul. 22, 2020, U.S. Office Action issued for related U.S. Appl. No. 15/922,121.

(Continued)

*Primary Examiner* — Erin D Bishop
(74) *Attorney, Agent, or Firm* — Paratus Law Group, PLLC

(57) ABSTRACT

The control device for the hybrid vehicle including: an engine; a first motor generator which generates electric power by power of the engine; a battery; and a second motor generator connected to driving wheels and driven by supplying electric power from at least one of the battery and the first motor generator. In the control device, a braking control, which drives the first motor generator as an electric motor by regenerative power obtained by operating the second motor generator as a generator at the time of braking of the hybrid vehicle, and in which the engine is utilized as a load of the first motor generator, is executed when a variable representing a charging state of the battery by a level of a value is equal to or greater than a predetermined value and use of a mechanical brake of the hybrid vehicle is restricted.

12 Claims, 6 Drawing Sheets

(51) Int. Cl.
    *B60W 10/08*     (2006.01)
    *B60W 20/20*     (2016.01)
    *B60W 10/06*     (2006.01)
    *B60W 10/184*     (2012.01)
    *B60K 6/442*     (2007.10)
    *B60W 20/17*     (2016.01)

(52) U.S. Cl.
    CPC .......... *B60W 10/184* (2013.01); *B60W 20/17* (2016.01); *B60W 20/20* (2013.01); *B60W 30/18018* (2013.01); *B60W 30/18072* (2013.01); *B60W 30/18127* (2013.01); *B60W 30/18136* (2013.01); *B60W 2510/18* (2013.01); *B60W 2510/244* (2013.01)

(56) References Cited

U.S. PATENT DOCUMENTS

| | | | |
|---|---|---|---|
| 10,029,689 B2 * | 7/2018 | Oguri | B60W 10/06 |
| 2001/0020554 A1 | 9/2001 | Yanase et al. | |
| 2004/0238244 A1 | 12/2004 | Amanuma et al. | |
| 2013/0054062 A1 | 2/2013 | Matsushita | |
| 2013/0173107 A1 | 7/2013 | Kokon | |

FOREIGN PATENT DOCUMENTS

| | | |
|---|---|---|
| CN | 104648374 A | 5/2015 |
| JP | 2000-217201 A | 8/2000 |
| JP | 2001-238303 A | 8/2001 |
| JP | 2002-238105 A | 8/2002 |
| JP | 3480489 B2 | 12/2003 |
| JP | 2013-035480 A | 2/2013 |
| JP | 5965459 B2 | 8/2016 |

OTHER PUBLICATIONS

Aug. 5, 2020, Chinese Office Action issued for related CN application No. 201810198323.4.

Sep. 4, 2018, Japanese Office Action issued for related JP application No. 2017-053550.

* cited by examiner

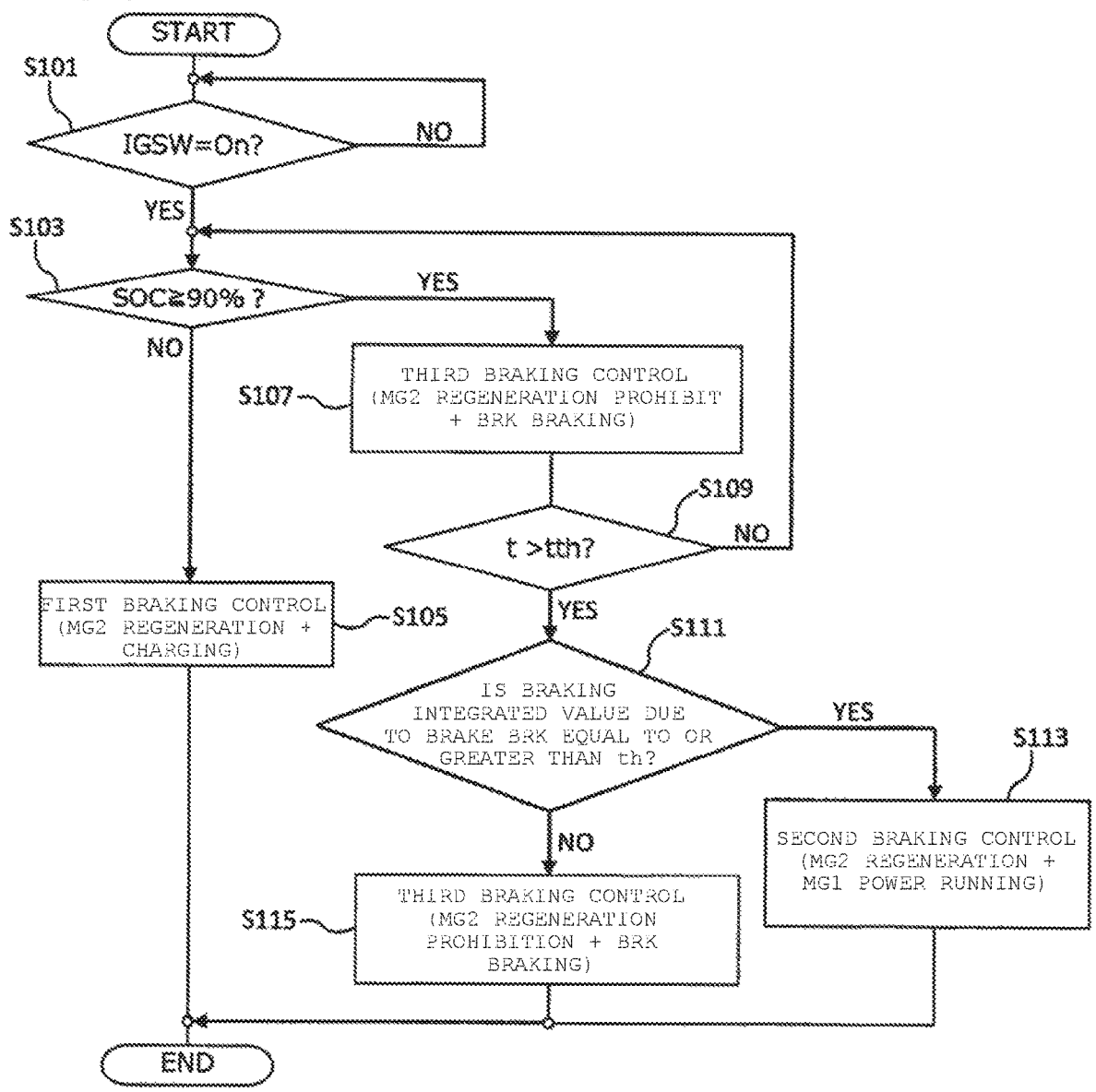

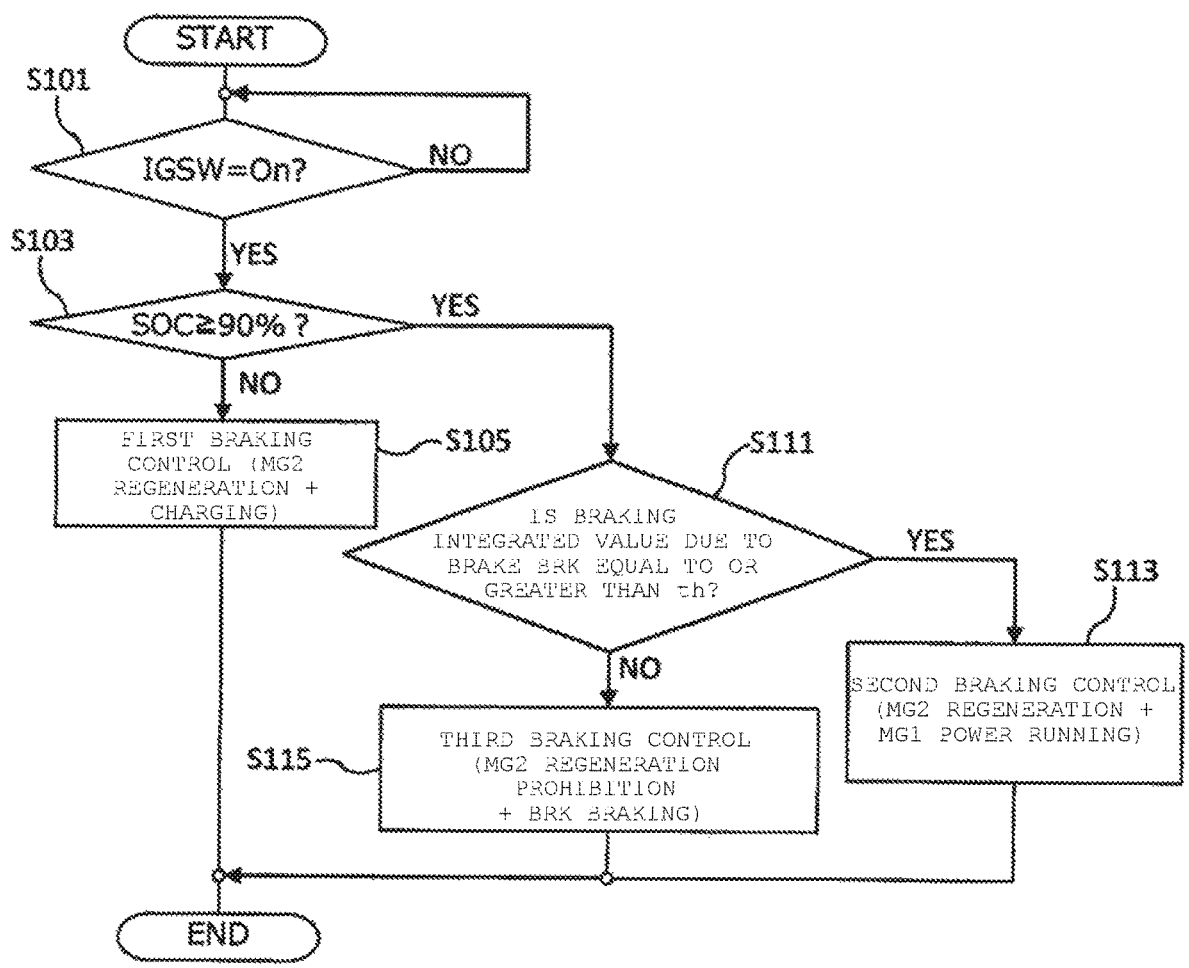

CONTROL DEVICE FOR HYBRID VEHICLE

CROSS-REFERENCE TO RELATED APPLICATION

This application is a divisional of U.S. patent application Ser. No. 15/922,121, filed on Mar. 15, 2018, which claims priority to Japanese Patent Application No. 2017-053550, filed on Mar. 17, 2017, which are all hereby incorporated by reference in their entirety.

BACKGROUND

1. Field of the Invention

The present invention relates to a control device for a hybrid vehicle.

2. Description of the Related Art

In a hybrid vehicle described in Japanese Patent No. 5965459, when engine braking is started after charging a traveling battery, after a braking situation immediately continued thereto, for example, after a braking situation when a hybrid vehicle goes down a slope or sloping land immediately after the start, there is a case where a driver misunderstands that no pure electric operation mode occurs.

Thus, a cold start exists and charging of the traveling battery is permitted during traveling operation when the charging level of the traveling battery is equal to or lower than a charging threshold value, the engine braking for braking the hybrid vehicle is inhibited for a predetermined traveling distance and/or for a predetermined period of time.

The hybrid vehicle disclosed in Japanese Patent No. 5965459 does not inhibit the engine brake when charging of the traveling battery is not permitted, that is, it is considered that the engine braking is performed. Therefore, when going down a slope or a sloping land after charged until the charging level of the traveling battery becomes a value greater than the charging threshold value, noise due to engine braking is generated. This noise causes a sense of incompatibility to the driver who tends to think that the quietness of the hybrid car is high due to the electric driving. In particular, since the driver is apt to feel a sense of incompatibility with the engine sound generated immediately after the charging of the traveling battery has been completed, the traveling comfort for the driver is deteriorated.

SUMMARY

An object of the present invention is to provide a control device for a hybrid vehicle which can improve driving comfort for a driver even when charging of a battery cannot be permitted.

According to a first aspect of the invention, there is provided a control device for a hybrid vehicle including: an engine; a first motor generator configured to generate electric power by power of the engine; a battery; and a second motor generator connected to driving wheels and configured to be driven by supplying electric power from at least one of the battery and the first motor generator, wherein when a variable representing a charging state of the battery by a level of a value is greater than or equal to a predetermined value, the control device performs a control to drive the first motor generator as an electric motor by regenerative power obtained by operating the second motor generator as a generator at the time of braking of the hybrid vehicle so that a mechanical brake supplies the braking force, before a braking control, in which the engine is utilized as a load of the first motor generator, is started.

According to a second aspect of the invention, in the control device according to the first aspect, when the variable is equal to or greater than the predetermined value, a control is performed so that the mechanical brake supplies the braking force during a period after the start of the hybrid vehicle until the predetermined time period elapses.

According to a third aspect of the invention, in the control device according to the first aspect, when the variable is equal to or greater than the predetermined value, a control is performed so that the mechanical brake supplies the braking force during a period after the start of the hybrid vehicle until the use of the mechanical brake is restricted.

According to a fourth aspect of the invention, in the control device according to the third aspect, when the integrated value of the braking force by the mechanical brake is equal to or greater than a threshold value, the use of the mechanical brake is restricted.

According to a fifth aspect of the invention, in the control device according to the fourth aspect, the integrated value is calculated by multiplying a torque instructed to the mechanical brake by a traveling speed of the hybrid vehicle when driving the mechanical brake.

According to a first aspect of the invention, there is provided a control device for a hybrid vehicle including: an engine; a first motor generator configured to generate electric power by power of the engine; a battery; and a second motor generator connected to driving wheels and configured to be driven by supplying electric power from at least one of the battery and the first motor generator, wherein a braking control, which drives the first motor generator as an electric motor by regenerative power obtained by operating the second motor generator as a generator at the time of braking of the hybrid vehicle, and in which the engine is utilized as a load of the first motor generator, is executed when a variable representing a charging state of the battery by a level of a value is equal to or greater than a predetermined value and use of a mechanical brake of the hybrid vehicle is restricted.

According to a seventh aspect of the invention, in the control device according to the sixth aspect, when the variable is greater than or equal to the predetermined value and the use of the mechanical brake is not restricted, a control is performed so that the mechanical brake supplies a braking force at the time of braking of the hybrid vehicle.

According to an eighth aspect of the invention, in the control device according to the sixth aspect or the seventh aspect, when the integrated value of the braking force by the mechanical brake is equal to or greater than a threshold value, the use of the mechanical brake is restricted.

According to a ninth aspect of the invention, in the control device according to the eighth aspect, the integrated value is calculated by multiplying a torque instructed to the mechanical brake by a traveling speed of the hybrid vehicle when driving the mechanical brake.

According to a tenth aspect of the invention, in the control device according to any one of the sixth to ninth aspects, the control device for a hybrid vehicle, wherein when the variable is equal to or larger than the predetermined value and the use of the mechanical brake is restricted during a period of time after the start of the hybrid vehicle until a predetermined time elapses, the braking control is executed.

According to the first to third aspects, in a state in which, since the variable representing the charging state of the battery is equal to or higher than the predetermined value, until the predetermined time has elapsed after the activation of the vehicle or until the use of the mechanical brake is restricted even after the predetermined time has elapsed, since braking is performed by using the brake, no engine sound is generated. That is, when the engine sound is generated, the occurrence of engine sound can be suppressed immediately after the start of the vehicle in which the driver is likely to feel discomfort.

According to the sixth aspect, in a state in which, since the variable representing the charging state of the battery is equal to or greater than a predetermined value, in the braking control performed when the use of the mechanical brake is restricted, the first motor generator driven by the regenerative power obtained at the time of braking uses the engine as a load, and thus, engine noise is generated. However, in the braking control performed when the use of the mechanical brake is not restricted, no engine sound is generated. Therefore, even in a state in which charging of the battery cannot be permitted, if the use of the mechanical brake is not restricted, it is possible to improve the traveling comfort for the driver, without causing the driver of the vehicle to feel uncomfortable.

According to the seventh aspect, even when charging of the battery cannot be permitted because the variable representing the state of charge of the battery is equal to or greater than the predetermined value, if the use of the mechanical brake is not restricted, since the mechanical brake supplies the braking force, no engine sound is generated. Therefore, it is possible to improve traveling comfort without causing the driver to feel uncomfortable.

According to the fourth and eighth aspects, when the integrated value of the braking by the mechanical brake becomes equal to or larger than the threshold value, since the use of the mechanical brake is restricted, the mechanical brakes can be used until the integrated value reaches the threshold value.

According to the fifth and ninth aspects, when the torque instructed to the mechanical brake is multiplied by the traveling speed of the hybrid vehicle which is the rotational speed, the braking force by the mechanical brake can be obtained. This braking force has a correlation with the calorific value in the mechanical brake. Therefore, if the use of the mechanical brake is restricted in accordance with the integrated value of the torque and the traveling speed, the excessive heat generation of the mechanical brake can be prevented.

According to the tenth aspect, when the use of the mechanical brake is restricted only when the predetermined time has elapsed after the start of the hybrid vehicle, the execution of the braking control with the engine sound is restricted. In other words, if the use of mechanical brakes is not restricted, braking control with engine sound is not executed. Accordingly, it is possible to suppress the occurrence of the engine sound immediately after the start of the hybrid vehicle that the driver feels uncomfortable when the engine sounds.

BRIEF DESCRIPTION OF THE DRAWINGS

The present invention will become more fully understood from the detailed description given hereinbelow and the accompanying drawing which is given by way of illustration only, and thus is not limitative of the present invention and wherein:

FIG. 5 is a flowchart illustrating a flow of processing performed by a control unit when a braking control is selected after activation of a vehicle; and FIG. 6 is a flowchart illustrating another example of a flow of processing performed by a control unit when braking control is selected after activation of a vehicle.

DETAILED DESCRIPTION OF THE INVENTION

Hereinafter, embodiments of the present invention will be described with reference to the drawings.

A HEV (hybrid electrical vehicle) has a motor generator and an engine, and travels with the driving force of a motor generator and/or engine depending on the traveling state of the vehicle. The HEV is roughly classified into two main types of series and parallel. The series type of HEV travels with the power of the motor generator. The engine is mainly used for power generation, and the power generated by another motor generator by the power of the engine is charged to the battery or is supplied to the motor generator. On the other hand, the parallel type of HEV travels with the driving force of either one or both of the motor generator and the engine. Also known are HEVs capable of switching between both methods. In this type of HEV, the clutch is disconnected or engaged (connected or disconnected) depending on the traveling state, thereby switching the transmission system of the driving force to one of the series type and the parallel type.

Figure 1:
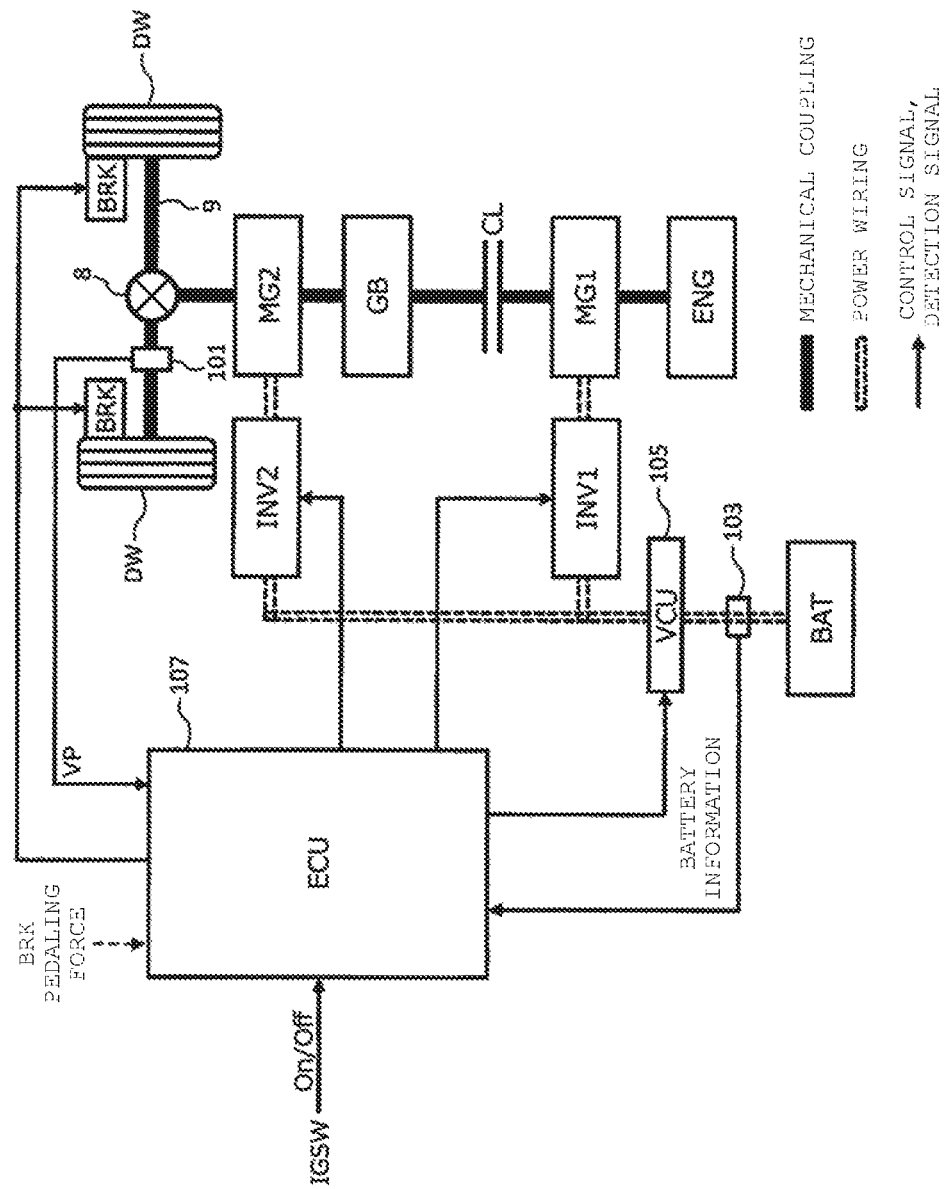
FIG. 1 is a block diagram illustrating an internal configuration of an HEV (vehicle) capable of switching between a series type and a parallel type.

FIG. 1 is a block diagram illustrating an internal configuration of an HEV capable of switching between a series type and a parallel type. The HEV (hereinafter simply referred to as "vehicle") 1 includes an engine ENG, a first motor generator MG1, a second motor generator MG2, a lock-up clutch (hereinafter simply referred to as a "clutch") CL, a gear box (hereinafter simply referred to as "gear") GB, a vehicle speed sensor 101, a battery sensor 103, a battery BAT, a VCU (Voltage Control Unit) 105, a first inverter INV1, a second inverter INV2, a brake BRK, and an ECU (Electronic Control Unit) 107. In FIG. 1, the thick solid line indicates the mechanical connection, the double dotted line indicates the power wiring, and the thin solid line arrow indicates the control signal or the detection signal.

The engine ENG can also function as a load of the first motor generator MG1 that drives the first motor generator MG1 as a generator in a state in which the clutch CL is disconnected and operates as an electric motor when braking the vehicle. However, when the clutch CL is engaged, the power which is output from the engine ENG is transmitted to the drive wheels DW and DW via the first motor generator MG1, the clutch CL, the gear GB, the second motor generator MG2, the differential gear 8 and the drive axle 9, as mechanical energy for the vehicle to travel.

The first motor generator MG1 is driven by the power of the engine ENG and generates power. Further, the first motor generator MG1 can operate as an electric motor when braking the vehicle.

In the second motor generator MG2, the rotor operates as an electric motor by the power supply from at least one of the battery BAT and the first motor generator MG1, and generates the power for traveling the vehicle. The torque generated by the second motor generator MG2 is transmitted to the drive wheels DW and DW via the differential gear 8 and the drive axle 9. Further, the second motor generator MG2 can operate as a generator when braking the vehicle.

The clutch CL disconnects or engages (disconnects and connects) the transmission path of the power from the engine ENG to the drive wheels DW and DW in accordance with an instruction from the ECU 107. If the clutch CL is in the disconnection state, the power which is output from the engine ENG is not transmitted to the drive wheels DW and DW, and if the clutch CL is in the connected state, the power which is output from the engine ENG is transmitted to the drive wheels DW and DW. The gear GB includes a gear shift stage or a fixed gear stage, shifts the power from the engine ENG at a predetermined gear ratio, and transmits the power to the drive wheels DW. The gear ratio at the gear GB is changed in accordance with the instruction from the ECU 107.

The battery BAT has a plurality of storage cells connected in series, and supplies a high voltage of, for example, 100 to 200 V. The storage cell is, for example, a lithium ion battery or a nickel hydrogen battery.

The vehicle speed sensor 101 detects the traveling speed (vehicle speed VP) of the vehicle. A signal indicating the vehicle speed VP detected by the vehicle speed sensor 101 is sent to the ECU 107.

The battery sensor 103 detects the output (terminal voltage, charging and discharging current) of the battery BAT. Signals indicating the terminal voltage, charging and discharging current, and the like detected by the battery sensor 103 are sent to the ECU 107 as battery information.

The VCU 105 boosts the output voltage of the battery BAT when the second motor generator MG2 operates as a motor. Further, the VCU 105 steps down the output voltage of the second motor generator MG2 when charging the battery BAT with regenerative power generated by the second motor generator MG2 and converted into direct current at the time of braking of the vehicle. Further, the VCU 105 steps down the electric power generated by the first motor generator MG1 and converted into DC by driving of the engine ENG. The power stepped down by the VCU 105 is charged in the battery BAT.

Figure 2:
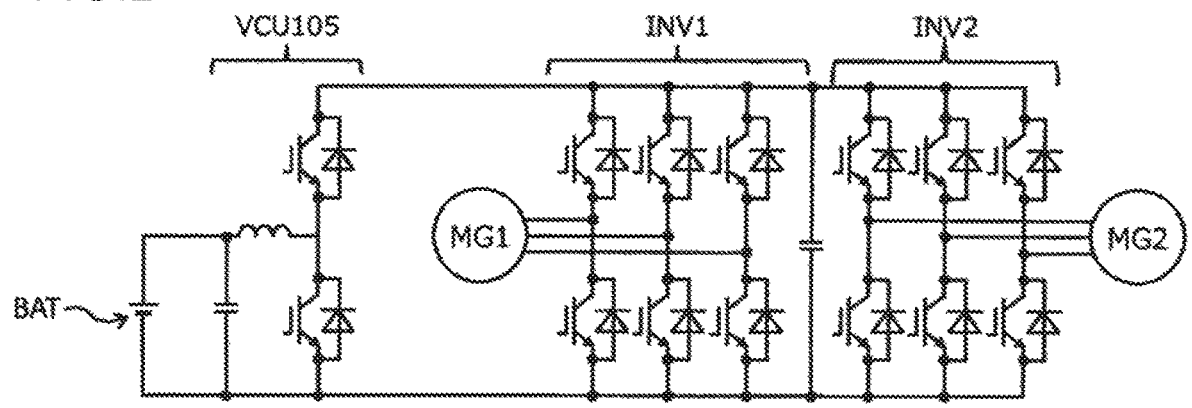
FIG. 2 is an electric circuit diagram illustrating a relationship among a battery, a VCU, a first inverter, a second inverter, a first motor generator, and a second motor generator.

FIG. 2 is an electric circuit diagram illustrating a relation between the battery BAT, the VCU 105, the first inverter INV1, the second inverter INV2, the first motor generator MG1, and the second motor generator MG2. As illustrated in FIG. 2, the VCU 105 boosts the V2 voltage on the output side to a voltage higher than the V1 voltage by switching on and off the two switching elements using the V1 voltage which is output from the battery BAT as an input voltage. When the two switching elements of the VCU 105 do not perform on/off switching operation, the voltage V2 is equal to the voltage V1.

The first inverter INV1 converts the AC voltage generated by the first motor generator MG1 into a DC voltage by driving of the engine ENG. Further, the first inverter INV1 converts the DC voltage generated by the second motor generator MG2 at the time of braking of the vehicle and converted by the second inverter INV2 into AC voltage, and supplies the three phase current to the first motor generator MG1. The second inverter INV2 converts the DC voltage into an AC voltage, and supplies a three-phase current to the second motor generator MG2. In addition, the second inverter INV2 converts the AC voltage generated by the second motor generator MG2 at the time of braking of the vehicle into a DC voltage.

The brake BRK is a mechanical brake. That is, the brake BRK brakes the vehicle by hydraulic pressure or the like controlled in accordance with the operation of the brake pedal by the driver of the vehicle.

Figure 3:
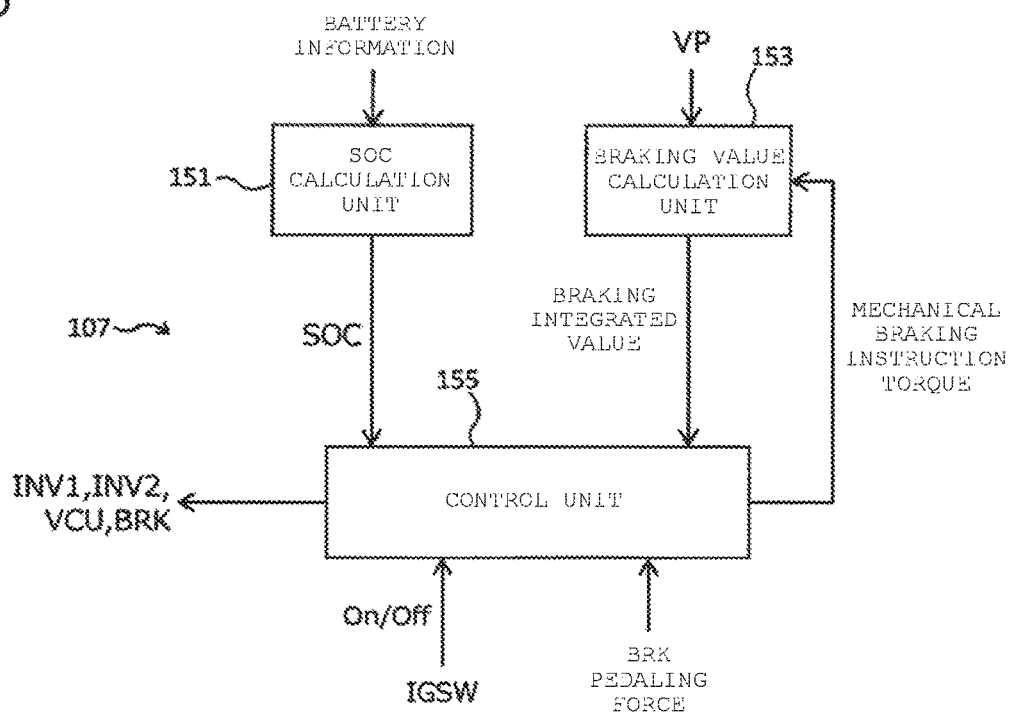
FIG. 3 is a block diagram illustrating an internal configuration of an ECU that performs different braking controls depending on a state of a vehicle.

The ECU 107 controls the first inverter INV1, the second inverter INV2, the VCU 105 and the brake BRK in accordance with the state of the vehicle, thereby performing the braking control suitable for the state of the vehicle. FIG. 3 is a block diagram illustrating an internal configuration of the ECU 107 that performs different braking control depending on the state of the vehicle. As illustrated in FIG. 3, the ECU 107 includes an SOC calculation unit 151, a braking value calculation unit 153, and a control unit 155. Each constituent element included in the ECU 107 will be described below.

The SOC calculation unit 151 calculates SOC (State Of Charge) which is a variable expressing the state of charge of the battery BAT by the level of the value, on the basis of the battery information obtained from the battery sensor 103.

The braking value calculation unit 153 multiplies the vehicle speed VP obtained from the vehicle speed sensor 101 by the braking torque instructed to the brake BRK by the control unit 155 to calculate an integrated value (an integrated braking value) of the braking amount provided by the brake BRK. If the torque instructed by the brake BRK is multiplied by the vehicle speed VP which is the rotational speed, the braking force provided by the brake BRK is obtained. This braking force has a correlation with the calorific value in the brake BRK. Therefore, if the integrated value (the integrated braking value) of the torque and the vehicle speed VP is large, since the heat generation in the brake BRK is estimated, it is desirable to limit the use of the brake BRK.

On the basis of the SOC calculated by the SOC calculation unit 151 and the integrated braking value calculated by the braking value calculation unit 153, the control unit 155 selects which type of the braking control is performed at the time of braking of the vehicle, and performs a control of at least one of the first inverter INV1, the second inverter INV2, the VCU 105, and the brake BRK so as to generate a braking torque corresponding to the brake pedal depression force (BRK depression force) representing the operation magnitude of the brake pedal.

Figure 4A:
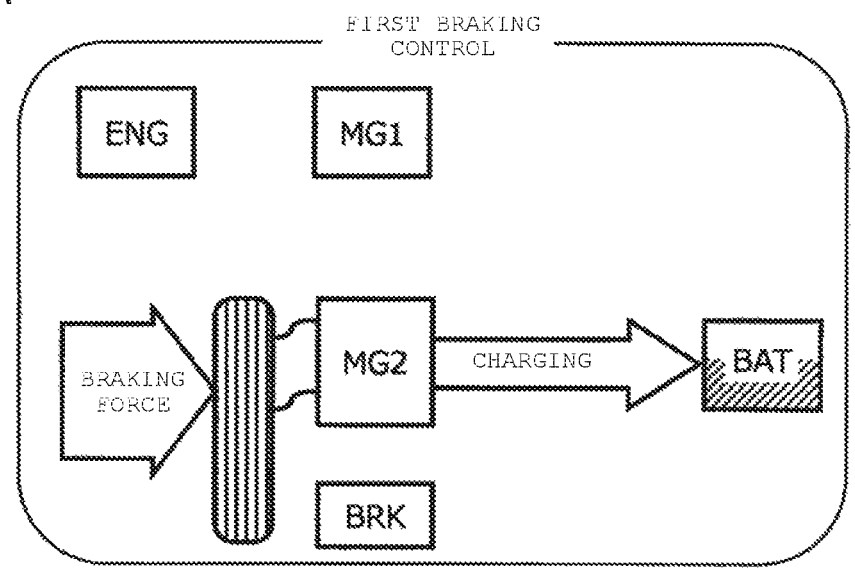
FIG. 4A is an explanatory view illustrating the flow of energy at the time of a first braking control.
Figure 4B:
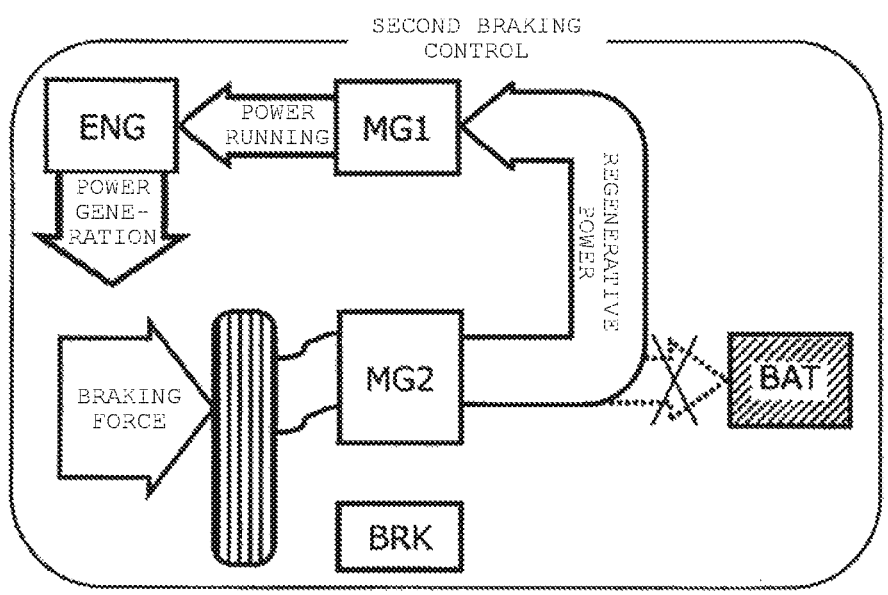
FIG. 4B is an explanatory diagram illustrating a flow of energy at the time of a second braking control.
Figure 4C:
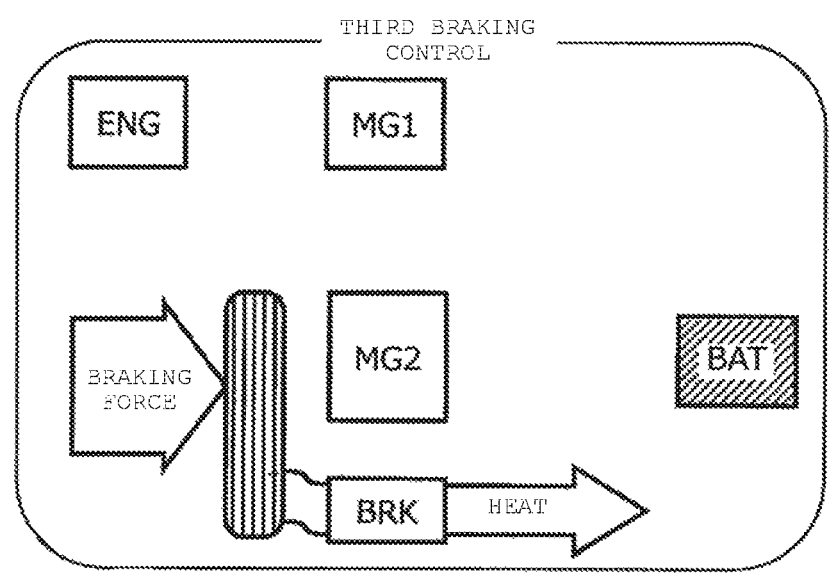
FIG. 4C is an explanatory diagram illustrating the flow of energy at the time of a braking control.

There are three types of braking control capable of being selected by the control unit 155 when braking the vehicle. FIGS. 4A to 4C illustrate respective states of three braking controls. FIG. 4A is an explanatory diagram illustrating the flow of energy at the time of the first braking control, FIG. 4B is an explanatory diagram illustrating the flow of energy at the time of the second braking control, and FIG. 4C is an explanatory view illustrating the flow of energy at the time of the third braking control.

In the first braking control illustrated in FIG. 4A, the second motor generator MG2 operates as a generator by the braking force of the vehicle, and the regenerative power generated by the second motor generator MG2 is charged in the battery BAT. In the second braking control illustrated in FIG. 4B, the second motor generator MG2 operates as a generator by the braking force of the vehicle, and the first motor generator MG1 is subjected to power-running by the regenerative power generated by the second motor generator MG2 to reverse the engine ENG. At this time, the engine ENG functions as the load of the first motor generator MG1, and the regenerative power is consumed for the power traveling operation of the first motor generator MG1. Further, in the third braking control illustrated in FIG. 4C, the brake BRK supplies the braking force of the vehicle.

In this manner, in the first braking control and the second braking control, a regenerative brake that operates the second motor generator MG2 as a generator at the time of braking of the vehicle is used. However, in the first braking control, the regenerative power is charged in the battery BAT, but in the second braking control, the first motor generator MG1 is driven as an electric motor by the regenerative power, and the load of the first motor generator MG1 is set to the engine ENG. In the third braking control, a regenerative brake is not used at the time of the working of the vehicle, and a mechanical brake using the brake BRK is used.

FIG. 5 is a flowchart illustrating the flow of processing performed by the control unit 155 when the braking control is selected after starting the vehicle. As illustrated in FIG. 5, the control unit 155 determines whether or not an ignition switch (IGSW) is turned on (step S101). When the ignition switch is turned on and the vehicle is activated, the control unit 155 proceeds to step S103. In step S103, the control unit 155 determines whether or not the SOC of the battery BAT calculated by the SOC calculation unit 151 is equal to or greater than a predetermined value (e.g., 90%). If the SOC is less than the predetermined value (SOC<90%) The process proceeds to step S105. If the SOC is equal to or larger than the predetermined value (SOC≥90%), the process proceeds to step S107.

In step S105, the control unit 155 selects the first braking control illustrated in FIG. 4A as a mode of a braking control performed when the vehicle is braked. In step S107, the control unit 155 selects the third braking control illustrated in FIG. 4C as a mode of braking control to be performed when the vehicle is braked. Next, the control unit 155 determines whether or not the predetermined time tth has elapsed from the start of the vehicle (elapsed time t>tth) (step S109). If there is a relation of t>tth, the process proceeds to step S111, and if there is a relation of t≤tth, the process returns to step S103.

In step S111, the control unit 155 determines whether or not the integrated value (integrated braking value) of the braking amount provided by the brake BRK calculated by the braking value calculation unit 153 is equal to or larger than the threshold value th, if there is a relation of the integrated braking value≥th and the use of the brake BRK is in a restricted state, the process proceeds to step S113. If there is a relation of the brake integrated value<th and the use of the brake BRK is not restricted, the process proceeds to step S115. In step S113, the control unit 155 selects the second braking control illustrated in FIG. 4B as a mode of a braking control performed when the vehicle is braked. In a case where the required braking force cannot be obtained only by the second braking control at the time of braking the vehicle when the second braking control is selected, the shortage may be supplemented by the braking force provided by the brake BRK. In step S115, the control unit 155 selects the third braking control illustrated in FIG. 4C as a mode of braking control performed when the vehicle is braked. In this way, according to the flowchart of FIG. 5, when the SOC of the battery BAT is equal to or larger than the predetermined value after the vehicle is started, the third braking control is selected until the use of the brake BRK is restricted to perform a process of supplying a braking force by the brake BRK.

In the flowchart of FIG. 5, when the SOC of the battery BAT is equal to or greater than a predetermined value (for example, 90%), until the predetermined time tth has elapsed from the start of the vehicle, the third braking control is selected irrespective of the magnitude of the integrated braking value and the threshold value th, but steps S107 and S109 are not performed as in the flowchart shown in FIG. 6, and when the SOC is equal to or larger than the predetermined value, the braking control depending on the magnitude of the integrated braking value and the threshold value th may be selected, regardless of the elapsed time from the start of the vehicle.

As described above, according to the present embodiment, in a state in which, since the SOC of the battery BAT is equal to or higher than the predetermined value (90%), until the predetermined time tth has elapsed after the activation of the vehicle or until the use of the brake BRK is restricted even after the predetermined time tth has elapsed, since braking is performed by using the brake BRK, no engine sound is generated. That is, when the engine sound is generated, the occurrence of engine sound can be suppressed immediately after the start of the vehicle in which the driver is likely to feel discomfort.

Further, in a state in which, since the SOC of the battery BAT is equal to or greater than a predetermined value (90%), in the braking control (second braking control) performed when the use of the brake BRK is restricted because the integrated braking value is the threshold value th, the first motor generator MG1 driven by the regenerative power obtained at the time of braking uses the engine ENG as a load, and thus, engine noise is generated. However, in the braking control (third braking control) performed when the use of the brake BRK is not restricted, the brake BRK supplies the braking force and no engine sound is generated. Therefore, even in a state in which charging of the battery BAT cannot be permitted, if the use of the brake BRK is not restricted, it is possible to improve the traveling comfort for the driver, without causing the driver of the vehicle to feel uncomfortable.

Further, if the use of the brake BRK is not restricted in the state in which the charging of the battery BAT cannot be not permitted, the braking control (second braking control) accompanied by the engine sound is not selected, and the third braking control for braking by the brake BRK is selected. Since there is a low possibility that the use of the brake BRK is restricted at the timing when the vehicle is started, it is possible to suppress the occurrence of engine sound immediately after the start of a vehicle that the driver is apt to feel uncomfortable when the engine sounds.

Further, it is to be noted that the present invention is not limited to the above-described embodiment, but may be appropriately modified, improved, and the like. For example, the vehicle is not limited to the HEV capable of switching between the series type and the parallel type, but may be a series type HEV or a parallel type HEV. The restriction on the use of the brake BRK is not limited to the integrated braking value but may be determined based on the temperature of the brake BRK or another parameter or the presence or absence of a failure of the brake BRK.

What is claimed is:

1. A control device for a hybrid vehicle including: an engine; a first motor generator configured to generate electric power by power of the engine; a battery; and a second motor generator connected to driving wheels and configured to be driven by supplying electric power from at least one of the battery and the first motor generator, wherein when a charging state of the battery is greater than or equal to a predetermined value, at a time of braking of the hybrid vehicle, a first control, in which the first motor generator is driven as an electric motor by regenerative power obtained by operating the second motor generator as a generator and in which the engine is utilized as a load of the first motor generator, or a second control, in which a mechanical brake supplies a braking force, is executed, and when the charging state of the battery is greater than or equal to the predetermined value and use of the mechanical brake of the hybrid vehicle is restricted, the first control is executed.

2. The control device for the hybrid vehicle according to claim 1, wherein, when the charging state is greater than or equal to the predetermined value and the use of the mechanical brake is not restricted, the second control is performed so that the mechanical brake supplies a braking force at the time of braking of the hybrid vehicle.

3. The control device for the hybrid vehicle according to claim 2, wherein, when an integrated value of the braking force by the mechanical brake is greater than or equal to a threshold value, the use of the mechanical brake is restricted.

4. The control device for the hybrid vehicle according to claim 3, wherein the integrated value is calculated by multiplying a torque instructed to the mechanical brake by a traveling speed of the hybrid vehicle when the mechanical brake is engaged.

5. The control device for the hybrid vehicle according to claim 4, wherein
after a start of the hybrid vehicle and when the charging state is greater than or equal to the predetermined value, the second control is executed, and
after a predetermined time has elapsed and when the use of the mechanical brake is restricted, the first control is executed.

6. The control device for the hybrid vehicle according to claim 3, wherein
after a start of the hybrid vehicle and when the charging state is greater than or equal to the predetermined value, the second control is executed, and
after a predetermined time has elapsed and when the use of the mechanical brake is restricted, the first control is executed.

7. The control device for the hybrid vehicle according to claim 2, wherein
after a start of the hybrid vehicle and when the charging state is greater than or equal to the predetermined value, the second control is executed, and
after a predetermined time has elapsed and when the use of the mechanical brake is restricted, the first control is executed.

8. The control device for the hybrid vehicle according to claim 1, wherein, when an integrated value of the braking force by the mechanical brake is greater than or equal to a threshold value, the use of the mechanical brake is restricted.

9. The control device for the hybrid vehicle according to claim 8, wherein the integrated value is calculated by multiplying a torque instructed to the mechanical brake by a traveling speed of the hybrid vehicle when the mechanical brake is engaged.

10. The control device for the hybrid vehicle according to claim 9, wherein
after a start of the hybrid vehicle and when the charging state is greater than or equal to the predetermined value, the second control is executed, and
after a predetermined time has elapsed and when the use of the mechanical brake is restricted, the first control is executed.

11. The control device for the hybrid vehicle according to claim 8, wherein
after a start of the hybrid vehicle and when the charging state is greater than or equal to the predetermined value, the second control is executed, and
after a predetermined time has elapsed and when the use of the mechanical brake is restricted, the first control is executed.

12. The control device for the hybrid vehicle according to claim 1, wherein
after a start of the hybrid vehicle and when the charging state is greater than or equal to the predetermined value, the second control is executed, and
after a predetermined time has elapsed and when the use of the mechanical brake is restricted, the first control is executed.

* * * * *